(12) United States Patent
Ikehara et al.

(10) Patent No.: US 7,476,285 B2
(45) Date of Patent: Jan. 13, 2009

(54) MOTORCYCLE TIRES AND METHOD OF PRODUCING THE SAME

(75) Inventors: Kiyoshi Ikehara, Kodaira (JP); Sumito Nakagawa, Kodaira (JP); Tsutomu Nakamura, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 290 days.

(21) Appl. No.: 11/038,364

(22) Filed: Jan. 21, 2005

(65) Prior Publication Data

US 2005/0121135 A1 Jun. 9, 2005

Related U.S. Application Data

(62) Division of application No. 10/003,291, filed on Dec. 6, 2001, now abandoned.

(30) Foreign Application Priority Data

| Dec. 8, 2000 | (JP) | ............................. 2000-374704 |
| Jan. 31, 2001 | (JP) | ............................. 2001-023438 |

(51) Int. Cl.
- *B29D 30/00* (2006.01)
- *B29D 30/06* (2006.01)
- *B60C 9/18* (2006.01)
- *B60C 9/22* (2006.01)

(52) U.S. Cl. .................... 156/110.1; 156/123; 156/124; 152/526; 152/531

(58) Field of Classification Search ................ 156/124, 156/526; 152/531
See application file for complete search history.

(56) References Cited

U.S. PATENT DOCUMENTS

| 4,738,096 A | | 4/1988 | Hatakeyama et al. |
| 5,162,067 A | * | 11/1992 | Miyawaki ................... 152/451 |
| 5,223,060 A | | 6/1993 | Imamiya et al. |
| 5,505,802 A | * | 4/1996 | Debroche et al. .......... 156/117 |
| 5,562,792 A | | 10/1996 | Caretta |
| 6,062,284 A | | 5/2000 | Caretta |

FOREIGN PATENT DOCUMENTS

| EP | 0 808 730 A1 | 11/1997 |
| GB | 1 487 426 A | 9/1977 |
| JP | 4-232035 | 8/1992 |
| JP | 4-362402 A | 5/1993 |
| JP | 6-255310 A | 9/1994 |
| JP | 7-41764 | 5/1995 |

OTHER PUBLICATIONS

Patent Abstracts of Japan, vol. 018, No. 653 (M-1720) (Dec. 12, 1994) as it relates to JP 06 255310 A (Sumitomo Rubber Ind., Ltd.) (Sep. 13, 1994).
Patent Abstracts of Japan, vol. 017, No. 237 (M-1408) (May 13, 1993) as it relates to JP 04 362402 A (Sumitomo Rubber Ind., Ltd.) (Dec. 15, 1992).

* cited by examiner

*Primary Examiner*—Justin Fischer
(74) *Attorney, Agent, or Firm*—Sughrue Mion, PLLC

(57) ABSTRACT

A motorcycle tire having excellent belt cord durability, high-speed durability, impact force absorbability, running stability and uniformity performances is produced by constituting a belt with a low-cost steel cord member having a specified twisting construction of 2 to 7 filaments and a specified space between the mutual filaments over a full length of the cord in the belt.

17 Claims, 8 Drawing Sheets

MOTORCYCLE TIRES AND METHOD OF PRODUCING THE SAME

This is a divisional application of parent application Ser. No. 10/003,291 filed Dec. 6, 2001, now abandoned.

BACKGROUND OF THE INVENTION

1. Field of the Invention

This invention relates to a motorcycle tire, and more particularly to a radial tire for a motorcycle and a method of producing the same. Especially, the invention relates to a radial tire for motorcycle capable of developing an excellent running stability by improving a belt durability and a high-speed durability with a low cost and improving an absorption property of impact force from a road surface and a tire uniformity and a method of producing the same.

2. Description of Related Art

The conventional motorcycle pneumatic tires have peculiar merits and demerits in accordance with bias or radial structure of a carcass, respectively. Particularly, the radial structure has a problem in the high-speed straight running stability. For this end, the applicant has proposed a pneumatic tire for a motorcycle having a radial carcass capable of developing an excellent straight running stability in JP-B-7-41764. The term "straight running stability" used herein means a resistance and convergence to lateral force inevitably input from a road surface during the running, wherein the straight running stability becomes excellent as the degree of shimmy in the tire created by disturbance is small and the converging of the shimmy created is fast.

Furthermore, JP-A-4-232035 is concerned with a radial tire for a motorcycle comprising a belt formed by helically winding cord(s) substantially in parallel to an equatorial plane of the tire and proposes a method of producing such a tire wherein the biting of an uncured tire by a mold is prevented and the occurrence of bear trouble in block corner parts of a tread portion (trouble of portions not contacting with a mold at a green state) is prevented by increasing the pushing of the uncured tire onto the mold while holding the steering stability performance in use.

The motorcycle pneumatic tire proposed in the first article has characteristics that a belt comprised of one or more belt layers containing steel cords arranged substantially in parallel to an equatorial plane of the tire is arranged along a crown profile of a radial carcass in parallel thereto to advantageously enhance a "hoop" effect of the belt to thereby ensure the high-speed durability and that the bending rigidity in the widthwise direction of the tire is effectively reduced to provide a more excellent high-speed straight running stability as compared with a bias-carcass tire while holding performances inherent to the radial tire.

In the conventional motorcycle radial tire, the cord in the belt is arranged substantially in parallel to the equatorial plane and substantially inextensible steel cords are used as the belt cord, so that an enlarging ratio of the belt ranging from the belt formation to a final shape in the mold is generally as small as about 3-4% and hence it is apt to easily cause the mold biting in the insertion of the uncured tire into the mold, particularly biting between adjacent sectors in the use of a split-type mold. And also, the pushing force onto block corner parts of the tread portion is lacking and it is apt to cause the bare trouble. In order to solve these problems, therefore, the motorcycle radial tire proposed in the second article has characteristics that so-called high-elongation steel cords having an elongation larger than that of the conventional steel cord, particularly steel cords of a langley twisting construction are used in the belt, and that the belt size in the tire building is made smaller than the conventional one and the enlarging ratio of the belt ranging from the belt formation to the final shape in the mold is made larger than the conventional one to elongate the steel cord member in the final belt shape inside the mold up to substantially an inextensible region to thereby enhance a resistance to external force in a product tire.

In the pneumatic tire for motorcycle proposed in the first article, the given object is sufficiently attained, but when such a tire is run on an irregular road surface or a road surface containing projections, the absorbability to impact force from the irregularity or projection is liable to be lacking and the tire easily vibrates in up-down directions. Such up-down vibrations damage the running stability as a whole inclusive of cornering owing to the fact that the vehicle is a motorcycle. As a result, it is required to more improve the impact force absorbability and the running stability.

In the motorcycle tire proposed in the second article, the given object is sufficiently attained likewise the first article. However, it is required to improve the following two points. Firstly, this type of the tire has a peculiarity that the section of the belt including an axial line of the tire in the tire building has an outward convex curved shape having a large curvature as seen from the fact that a ratio of maximum belt height as measured from a straight line connecting both ends of the belt to distance between both ends of the belt is within a range of 0.2-0.4. Therefore, the steel cord members in both side regions of the belt tend to slide down accompanied with the enlarging action of the belt over a period ranging from the belt formation to the final shape in the mold, or indicate a tendency of moving to more outward position. As a result, there are caused inconveniences such as non-uniform end count of steel cords in the widthwise direction of the belt, non-uniform tension applied to the steel cord and the like, whereby the uniformity properties of the tire are degraded.

Secondly, in the motorcycle tires including the tire disclosed in the first article, the gauge of tread rubber as an outer skin becomes very thin as compared with that in the tires for other vehicles, so that outer injury produced in the tread portion easily arrives at the belt existing inside the tire and hence water or the like penetrated from the outer injury corrodes the steel cords to lower the belt durability and high-speed durability. Particularly, in case of the tire that the layer of steel cords arranged substantially in parallel to the equatorial plane is not served as an auxiliary belt but functions as a main belt, the rust of the steel cord is a serious problem, so that it is required to sufficiently solve this problem. In addition, it is an important matter to decrease the cost of the steel cord member at the present time.

SUMMARY OF THE INVENTION

The inventors have found that the points to be improved in the aforementioned pneumatic tires for the motorcycles can be solved in motorcycle tires produced by a novel producing method using specific steel cord members.

It is, therefore, an object of the invention to provide a method of producing a motorcycle tire which can improve the belt durability and high-speed durability to satisfactory levels and also improve the impact force absorbability, running stability and uniformity properties by using a low cost steel cord member as well as motorcycle tires produced by such a method.

In order to achieve the above object, a first aspect of the invention lies in a method of producing a motorcycle tire by providing an uncured tire comprising a radial carcass ply extending between a pair of bead portions, a belt made of uncured rubberized steel cord members laid on an outer peripheral face of the carcass ply so as to arrange the steel cord members substantially in parallel to an equatorial plane of the tire, and a tread rubber and sidewall rubbers laid on outer surfaces of the belt and an uncovered portion of the carcass ply, placing the uncured tire in a mold and then subjecting it to vulcanization under a given internal pressure, characterized in that steel cord members each having either a single twisting construction of 2-7 filaments or a strand bundle construction using such a single twisting construction, and including a space between the mutual filaments over a full length of the cord is used in the belt, and that the belt is enlarged in a radial direction within a range of holding the space between the mutual filaments in the steel cord when the uncured tire is pushed onto an inner face of the mold under an inflation of the internal pressure, and that the vulcanization of the uncured tire is completed at a state that a coating rubber for the steel cord members in the belt freely fluidizing at a high temperature under a high pressure is penetrated into the full space between the mutual filaments and such a rubber penetration is held by heating the uncured tire.

In a preferable embodiment of the first aspect of the invention, the steel cord member used in the belt satisfies a relation of load-elongation curve when the elongation is plotted on an abscissa and the load is a load in an axial direction of the cord that an elongation ranging from a load of zero to a given load indicates a linear gentle gradient and an elongation ranging from a load exceeding the given load to a load corresponding to 70% of a breaking load indicates a linear steep gradient and a connecting line between terminal and start ends of these gradient lines indicates a downwardly convex curve having a small curvature, and a tensile force of a steel cord in a belt of a vulcanized tire after assembled onto an nominal rim but before filling with an nominal internal pressure is rendered into a range of loads corresponding to the elongation on the linear gentle gradient in the above relation curve.

In another preferable embodiment of the first aspect of the invention, the steel cord member used in the belt has an elongation at break of 3.0-6.0%, and an elongation range corresponding to both ends of the curved connecting line of small curvature in the above curve of the steel cord member occupies at least 5% of the elongation at break.

In the other preferable embodiment of the first aspect of the invention, the steel cord member used in the belt has an elongation at break of 3.0-6.0%, and an elongation range corresponding to both ends of the curved connecting line of small curvature in the above curve of the steel cord member occupies at least 10% of the elongation at break.

In a further preferable embodiment of the first aspect of the invention, the steel cord member has a space in a central portion at a section of the cord over a full length thereof, and at least one space between filaments communicating from the central space to an exterior of the steel cord member is existent over the full length of the cord.

In a still further preferable embodiment of the first aspect of the invention, one or more steel cord members for the belt are previously coated with an uncured rubber under a condition of tensile force within a range of holding the space, and the one or more steel cord members coated with the uncured rubber are helically and successively wound on the outer peripheral face of the radial carcass ply under the condition of tensile force within the range of holding the space to form the belt of one or more layers.

In another preferable embodiment of the first aspect of the invention, a rubber sheet covering the steel cord member for the belt is previously laid on an outer periphery of the radial carcass ply, and one or more steel cord members for the belt are successively and helically wound on the rubber sheet under a condition of tensile force within a range of holding the space and thereafter a coating rubber sheet is laid on the helically wound steel cord member to form a belt of one or more layers.

In the other preferable embodiment of the first aspect of the invention, the steel cord member used in the belt has a cord diameter of not less than $d\{(1/\sin \pi/N)+1\}\times 1.4$ (mm) when the number of filaments is N and a diameter of the filament is d (mm).

In a further preferable embodiment of the first aspect of the invention, when the uncured tire is pushed onto the inner face of the mold under an inflation of the internal pressure, an enlarging ratio of diameter at full width of the belt is within a range of 0.1-1.0%, and an enlarging ratio of diameter in each side region connecting to a central region of the belt in the widthwise direction is made smaller than an enlarging ratio of diameter in the central region.

In this case, the enlarging ratio of diameter in the central region of the belt in the widthwise direction is favorable to be within a range of 0.4-0.8%.

In another preferable embodiment of the first aspect of the invention, at a section of the uncured tire, a ratio of maximum height (hc) up to a section center of the steel cord member in the central region of the belt as measured from a straight line passing through both ends of the central region of the belt in the widthwise direction thereof to distance (dc) between centers of the steel cord members located at the outermost ends of the central region is within a range of 0.20-0.40, and a ratio of maximum height (hs) up to a section center of the steel cord member in each side region of the belt as measured from a straight line passing through both ends of the each side region to distance (ds) between centers of the steel cord member located at located at both ends of the each side region is made smaller than the above ratio (hc/dc).

In the other preferable embodiment of the first aspect of the invention, when the uncured tire is pushed onto the inner face of the mold provided with a rib forming a groove in the tread rubber, the enlarging ratio in the central region of the belt is made smaller than a ratio of rib height to a radius of a rib base portion in the inner face of the mold corresponding to the central region.

In a further preferable embodiment of the first aspect of the invention, the uncured tire is subjected to vulcanization by using the mold so that a ratio of maximum height of an outer surface of the tread rubber as measured from a straight line connecting both ends of the tread rubber in the widthwise direction to distance between both ends of the tread rubber in the widthwise direction is within a range of 0.20-0.40 at a section of a tire after the vulcanization when the tire is assembled onto an nominal rim and inflated under an nominal internal pressure.

In order to achieve the above object, a second aspect of the invention lies in a motorcycle tire comprising a tread portion, a pair of sidewall portions, a pair of bead portions, a carcass of one or more plies of radial arrangement of rubberized cords reinforcing these portions, and a belt reinforcing approximately whole region of the tread portion on an outer periphery of the carcass and comprised of one or more rubberized layers containing steel cords arranged substantially in parallel to an equatorial plane of the tire, characterized in that the tire is produced by any one of the aforementioned methods, and that the steel cord in the belt has a single twisting construction having 2-7 filaments and one or more penetration portion for coating rubber between mutual filaments over a full length of the cord, and that when the tire is assembled onto an nominal rim before the inflation of an nominal internal pressure, the steel cord in the belt has a tensile force applied thereto satisfying a relation of load-elongation curve when the elongation is plotted on an abscissa and the load is a load in an axial direction of the cord that an elongation ranging from a load of zero to a given load indicates a linear gentle gradient and an elongation ranging from a load exceeding the given load to a load corresponding to 70% of a breaking load indicates a linear steep gradient and a connecting line between terminal and start ends of these gradient lines indicates a downwardly convex curve having a small curvature.

In a preferable embodiment of the second aspect of the invention, the steel cord in the belt when the tire is assembled onto an nominal rim before the inflation under an nominal internal pressure has an elongation by tensile force applied thereto that a value of elongation in a full width of the belt is 0.20-0.85% and an elongation in a central region of the belt is larger than an elongation in each side region with respect to the central portion viewing from the curve of load and elongation in the steel cord member.

In another preferable embodiment of the second aspect of the invention, the steel cord in the central region of the belt when the tire is assembled onto an nominal rim before the inflation under an nominal internal pressure has an elongation by tensile force applied thereto that a value of elongation in a full width of the belt is 0.30-0.80% viewing from the above relation of load and elongation.

In the other preferable embodiment of the second aspect of the invention, the steel cord in the belt when the tire is assembled onto an nominal rim before the inflation under an nominal internal pressure satisfies that a range of elongation in the curve of the connecting portion has a value of not less than 5% of an elongation at break viewing from the above relation of load and elongation in the steel cord member.

In a further preferable embodiment of the second aspect of the invention, the steel cord in the belt when the tire is assembled onto an nominal rim before the inflation under an nominal internal pressure satisfies that a range of elongation in the curve of the connecting portion has a value of not less than 10% of an elongation at break viewing from the above relation of load and elongation in the steel cord member.

In a still further preferable embodiment of the second aspect of the invention, the carcass comprises one or more rubberized plies of radially arranged organic fiber cords, and the belt comprises one or more layers formed by helically winding one or more steel cords arranged substantially in parallel to an equatorial plane of the tire on an outside of the carcass in a radial direction thereof in a coating rubber so that a ratio of maximum height up to an outer surface of a tread rubber as measured from a straight line connecting both ends of the tread rubber in the widthwise direction to distance between both ends of the tread rubber in the widthwise direction thereof is within a range of 0.20-0.40.

In the other preferable embodiment of the second aspect of the invention, the steel cord member used in the belt has a cord diameter of not less than $d\{(1/\sin \pi/N)+1\}\times 1.4$ (mm) when the number of filaments is N and a diameter of the filament is d (mm).

The term "steel cord member" used herein means a steel cord before vulcanization used as a belt material of the tire, and the term "steel cord" used herein means a steel cord constituting the belt of the tire after vulcanization.

And also, the curve showing a relation between load and elongation in cord differs between the steel cord member and the steel cord. The linear gentle gradient means a zone ranging from a zero point of elongation to a point of separating a tangential line form a straight line of initial elongation when the tangential line is drawn to the straight line of initial elongation in the above curve of the steel cord member, and the linear steep gradient means a zone ranging from a maximum elongation position of a connecting curve to a position of elongation corresponding to 70% of elongation at break in the cord in the above curve of the steel cord member, wherein an elongation at a point of starting a separation of a tangential line drawn to a line of such a zone from the connecting curve is a minimum elongation of the linear steep gradient.

And also, the nominal rim and nominal internal pressure mean recommended rim and approved rims defined in JATMA YEAR BOOK 2000, and a maximum air pressure defined in JATMA YEAR BOOK 2000, respectively, and the nominal load means a maximum load defined in JATMA YEAR BOOK 2000.

BRIEF DESCRIPTION OF THE DRAWINGS

The invention will be described with reference to the accompanying drawings, wherein.

DETAILED DESCRIPTION OF THE INVENTION

Figure 1:
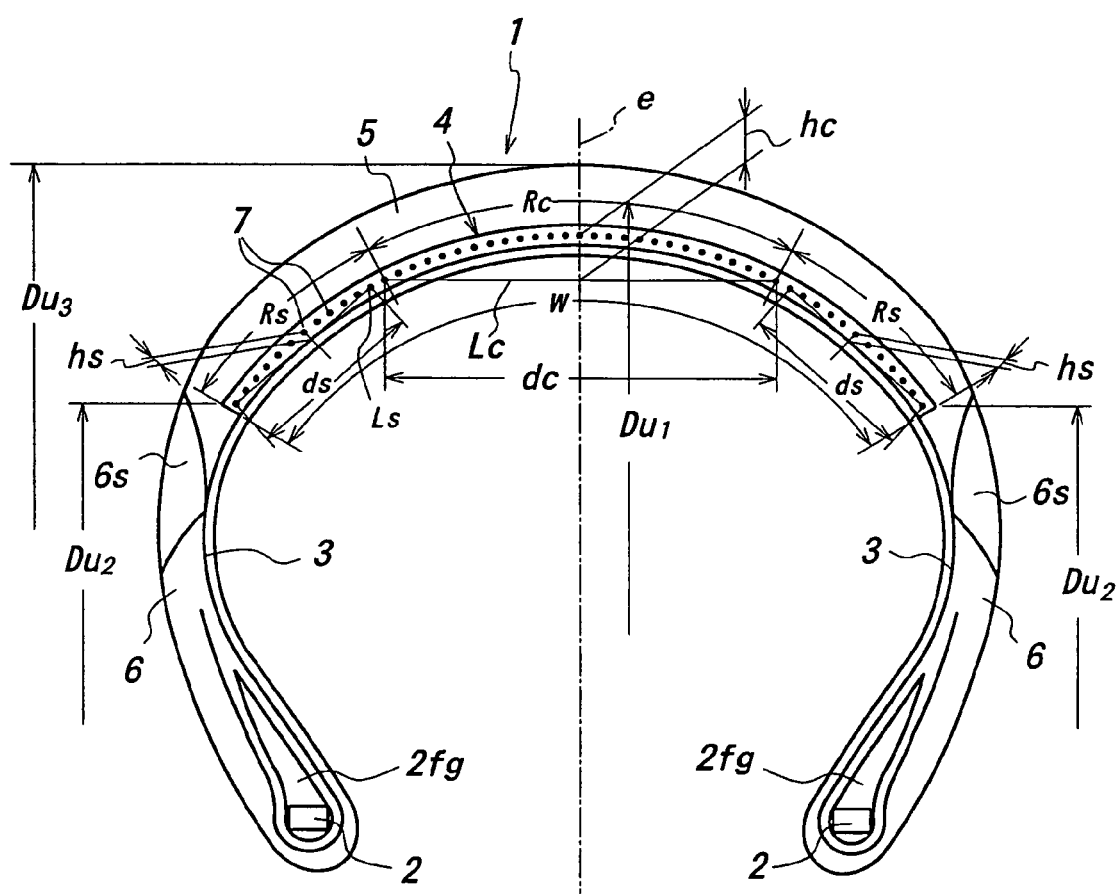
FIG. 1 is a diagrammatically section view of an uncured tire shaped by the producing method of the invention.

An uncured tire 1 for a motorcycle pneumatic tire shown in FIG. 1 comprises a pair of bead cores 2 and a pair of bead filler rubbers 2/g forming a respective bead portion, a toroidally radial carcass ply 3, a belt 4 superimposed about an outer peripheral face of the carcass ply 3, a pair of sidewall rubbers 6 and a tread rubber 5. The carcass ply 3 comprises organic fiber cords such as rayon cords, nylon cords, polyester cords or the like and an uncured coating rubber therefor, and the belt 4 comprises a steel cord member and an uncured coating rubber therefor. Moreover, the steel cord member covered with the uncured coating rubber includes a case that one or more steel cord members are coated with the uncured rubber and a case that plural steel cord members are sandwiched between uncured rubber sheets. Further, each of the above members 2 to 6 is an uncured member.

The building of the uncured tire 1 is carried out by laying an innerliner rubber and the carcass ply 3 on a cylindrical drum (not shown) in this order, setting the bead core 2 integrally united with the bead filler rubber 2/g thereon, turning the carcass ply 3 around the bead core 2 form inside toward outside in a direction of an axial line, laying the sidewall rubbers 6, approaching a pair of bead portions to each other to expandedly deform the carcass ply 3 into a toroidal shape having a given diameter, forming the belt 4 by using the steel cord member 7 and thereafter laying the tread rubber 5 provided on both ends with sleeve rubbers 6s having substantially the same rubber composition as the sidewall rubber 6.

Figure 2:
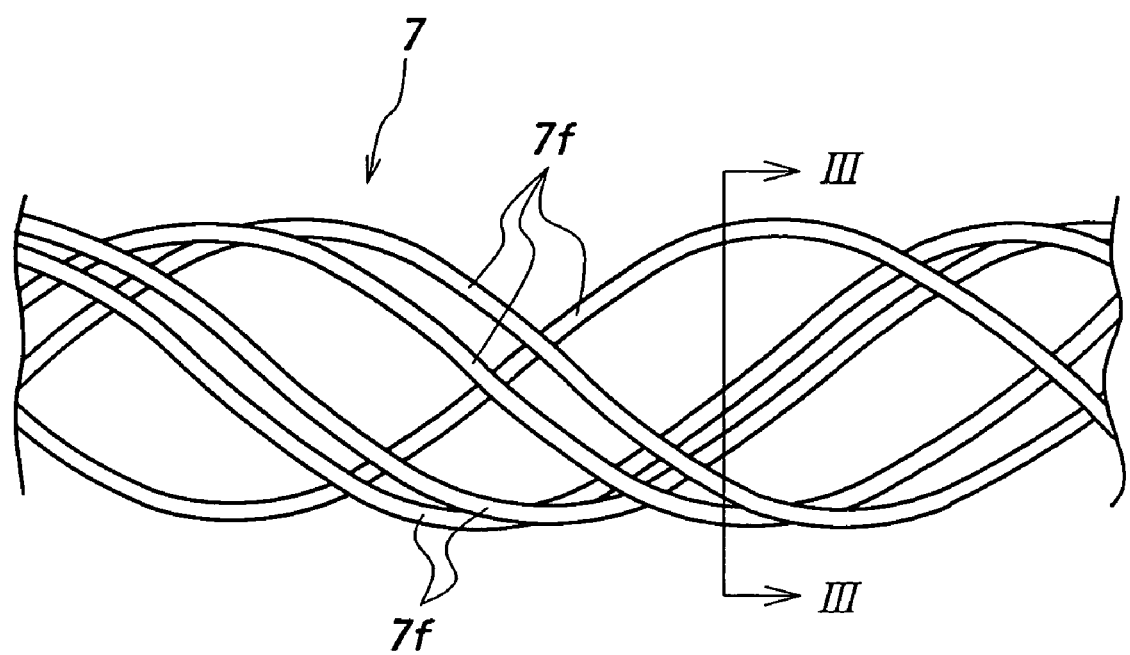
FIG. 2 is a partial side view of a steel cord member used in the producing method of the invention.
Figure 3A:
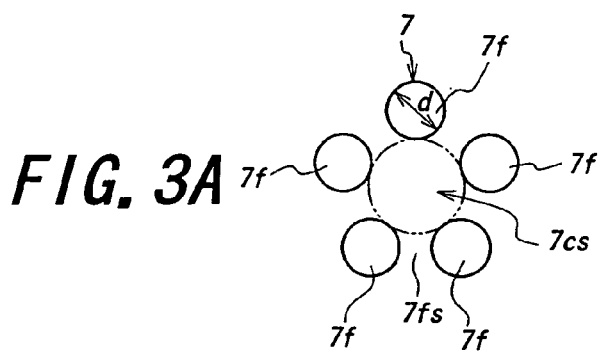
FIG. 3 is a diagrammatically section view of the steel cord member taken along a line III-III of FIG. 2.
Figure 3B:
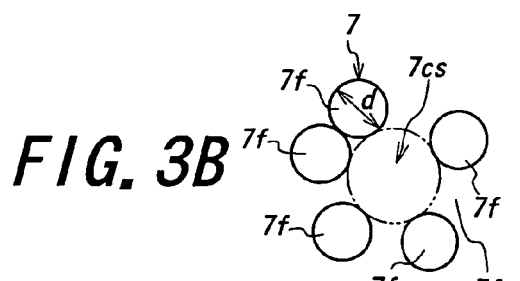
Figure 3C:
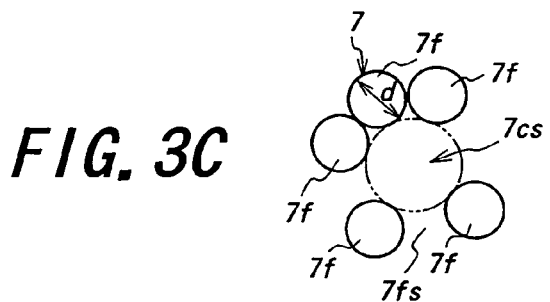
Figure 3D:
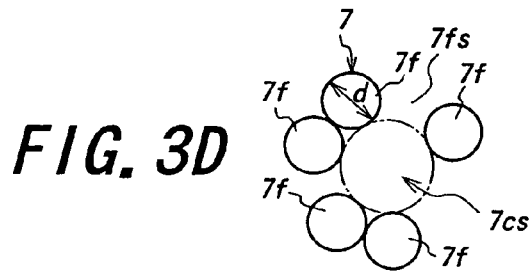
Figure 3E:
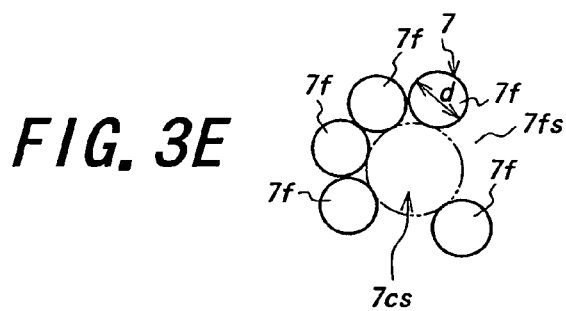
Figure 3F:
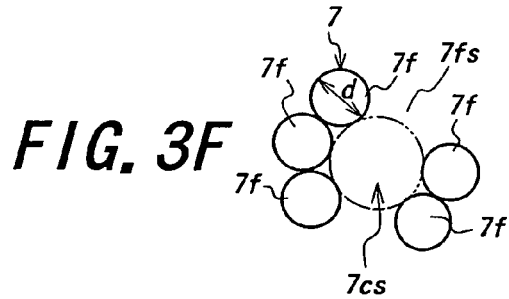
Figure 3G:
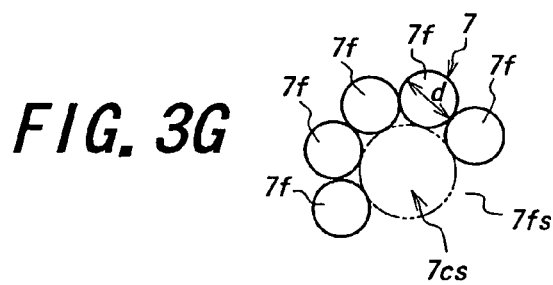

As shown in FIGS. 2 and 3, the steel cord member 7 used in the belt 4 has a single twisting construction of two to seven filaments 7f (five filaments in the illustrated embodiment) or a bundle construction using a plurality of the single twisting structures (not shown), wherein a space 7cs is existent over a full length of the cord 7 between mutual filaments 7f. The cord will be described with respect to only the single twisting construction below. The steel cord member 7 has a most preferable arrangement of the filaments 7f shown in FIG. 3A. In fact, the steel cord member 7 has arrangements of filaments 7f as shown in FIGS. 3B to 3G along a longitudinal direction of the member 7 shown in FIG. 2.

Thus, the steel cord member 7 has the space 7cs extending over the full length in a central portion at its section as shown by a phantom line of FIG. 3, wherein a space 7fs between the filaments 7f communicating from the central space 7cs to an exterior of the cord is existent in at least one position over the full length. In FIG. 3G is shown a section of the steel cord member 7 having one space 7fs between the filaments 7f. The filaments forming the space 7fs are mutual filaments 7f along a circumference of the steel cord member 7. The steel cord member 7 shown in FIG. 3A has spaces 7fs among all filaments 7f, while the steel cord members 7 shown in FIGS. 3B to 3G have one or more point contact parts or one or more short line contact parts among the mutual filaments 7f in the direction of the axial direction. Moreover, so-called open steel cord member 7T used in the belt of the conventional radial tire for passenger car has spaces 7fsT and 7csT between the filaments 7f as shown by a section in FIG. 8, wherein these spaces are considerably narrower than the spaces 7fs and 7cs between the filaments 7f.

The steel cord member 7 having such a central space 7cs is arranged substantially in parallel to an equatorial plane e of the tire 1 in the building of the uncured tire 1. The term "substantially" used herein means a case that an inclination angle of the steel cord member 7 with respect to the equatorial plane e is less than 1°. In fact, it is favorable to helically wind 1 to 5 steel cord members 7, preferably 2-4 steel cord members 7 on the outer periphery of the carcass ply 3 together.

In the building of the uncured tire 1 including the arrangement of the steel cord member 7, it is preferable to hold the central space 7cs and the space 7fs in the steel cord member 7 over a full width w along a curved face of the belt 4 in the whole building steps. In other words, in order to hold the central space 7cs and the space 7fs, it is important to slightly apply a tension to the steel cord member 7 in the whole building steps. The term "whole building steps" used herein means a process ranging from a stage of providing the steel cord member 7 as a belt member to a stage of completing the building of the uncured tire 1.

As a first method of forming the belt 4 in the uncured tire 1, one or more steel cord members 7 are previously coated with an uncured rubber, and the thus uncured rubber coated steel cord member(s) 7 is successively and helically wound on the outer peripheral face of the carcass ply 3 under a tensile force holding the spaces 7cs and 7fs, preferably a tension of 2940-4900 mN/cord to form the belt 4 of one or more layers, one belt layer in the illustrated embodiment. In this case, the helically winding pitch is not less than a diameter of the rubberized steel cord member 7.

As a second method of forming the belt 4 in the uncured tire 1, a coating rubber sheet for the steel cord member 7 is previously laid on the outer periphery of the carcass ply 3, and one or more steel cord members 7 are successively and helically wound on the rubber sheet under a tensile force holding the central space 7cs and the space(s) 7fs, and thereafter a coating rubber sheet is laid on the helically wound steel cord members 7 to form the belt 4 of one or more layers, one belt layer in the illustrated embodiment. In all of the first and second methods, the spaces 7cs and 7fs after the formation of the belt 4 become slightly narrower than those in the steel cord member before the formation of the belt.

The formed belt 4 is classified into three regions, a central region Rc and side regions Rs connecting to both ends of the central region in a widthwise direction as defined below. That is, as shown in FIG. 1, the full width w of the belt is divided into four equal parts at a section of the uncured tire 1 wherein a region corresponding to twice of w×¼ width or w×½ width near to the equatorial plane e is the central region and a region corresponding to w×¼ width located on each end of the central region is the side region Rs.

In the belt 4 after the formation thereof, a ratio (hc/dc) of maximum height hc up to a section center of the steel cord member 7 in the central region Rc of the belt as measured from a straight line Lc passing through the centers of the steel cord members 7 located at outermost ends of the central region of the belt in the widthwise direction thereof to distance dc between centers of the steel cord members 7 located at the outermost ends of the central region is within a range of 0.20-0.40, preferably 0.25-0.35. The ratio hc/dc is approximately equal to a value of a ratio of a maximum height up to an outer surface of a tread portion as measured from a straight line passing through both ends of the tread portion in a cured tire to a distance between both ends of the outer surface of the tread portion in the cured tire.

Then, a ratio (hs/ds) of maximum height hs up to a section center of the steel cord member 7 in each side region Rs of the belt as measured from a straight line Ls passing through the centers of the steel cord members located at outermost ends of the side region Rs to distance ds between centers of the steel cord members located at both ends of the side region is made smaller than the above ratio hc/dc. Particularly, it is favorable to make smaller a distance of a section center of the steel cord member 7 located in the vicinity of both ends of the side region Rs from the straight line Ls. Thus, a tendency of sliding down the steel cord members 7 in both side regions Rs accompanied with the enlargement of the belt 4 can be prevented and hence it is possible to uniformly hold the end count of the steel cord members 7 in the belt 4.

Figure 4:
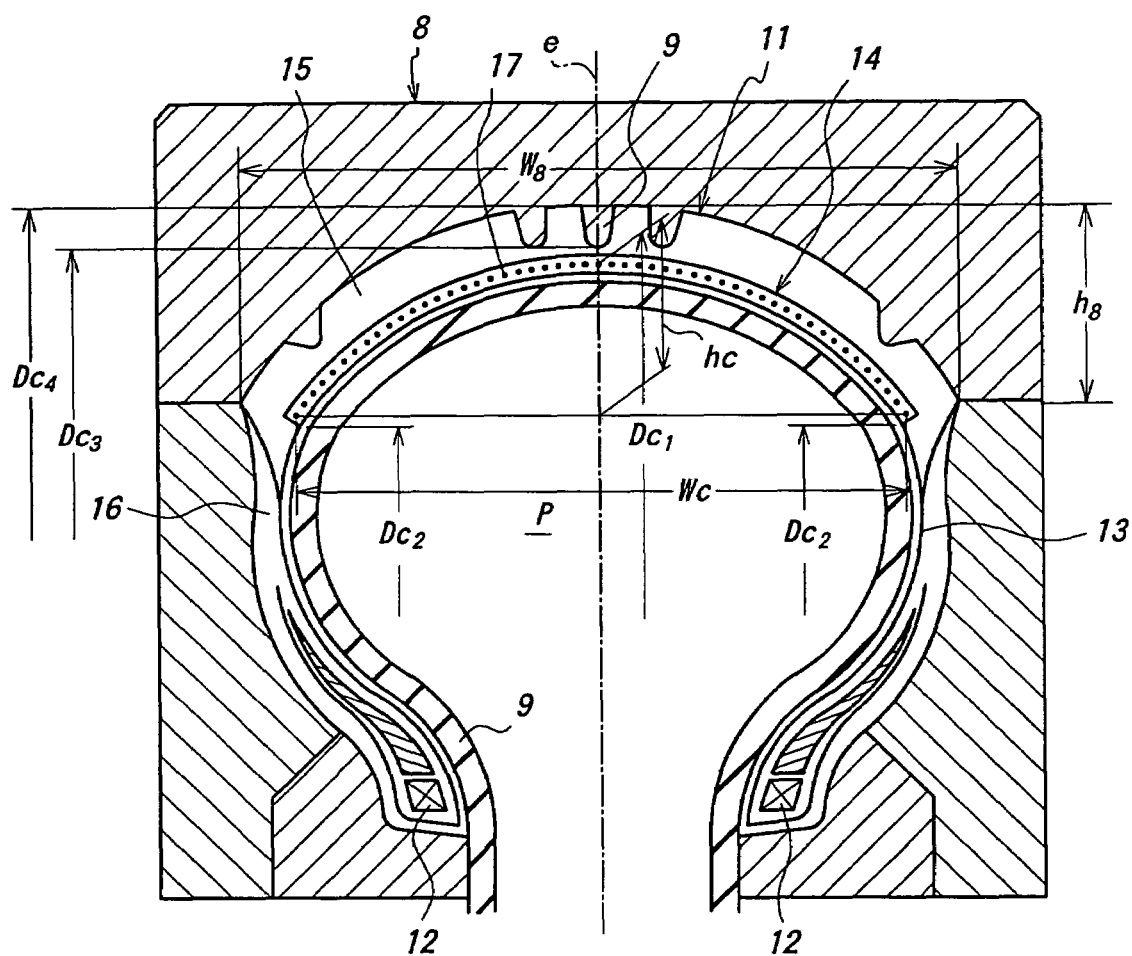
FIG. 4 is a diagrammatically section view of a cured tire and a vulcanization mold according to the producing method of the invention.

In FIG. 4, the uncured tire 1 is placed in a mold 8 by directly or indirectly applying a gas of an extremely low pressure (gauge pressure) to the inside of the uncured tire 1, and then the mold 8 is completely closed, and thereafter the uncured tire 1 is pushed onto the inner face of the mold 8 by applying a given high internal pressure P. Generally, as shown in FIG. 4, an internal pressure of a given gauge pressure P is filled in an inside of an expandable bladder 9 disposed in the vulcanization apparatus (not shown), and hence the uncured tire 1 is pushed onto the mold 8 through the bladder 9. Moreover, the bladder may be omitted. In any case, the belt 4 is enlarged from a central line of the mold 8 in a radial direction by pushing the uncured tire 1 onto the mold 8. It is important that the steel cord members 7 in the belt 4 hold given quantities of spaces 7cs and 7fs in the uncured tire 1 of a final shape formed by the pushing. Moreover, the illustrated mold 8 is so-called split-type mold dividing a tread portion forming region into plural parts in a circumferential direction.

When the belt 4 in the building of the uncured tire 1 shown in FIG. 1 has a diameter $Du_1$ (mm) at a center of the width w or the equatorial plane e and a diameter $Du_2$ (mm) at an end of the width w, while the steel cord member 7 in the annular belt 4 of the uncured tire 1 formed by pushing the uncured tire 1 onto the inner face of the mold under an inflation of the internal pressure as shown in FIG. 4 has a diameter $Dc_1$ (mm) at a widthwise center of the belt 4 and a diameter $Dc_2$ at the end of the width w of the belt in the radial direction of the tire 1, it is suitable that an enlarging ratio represented by the following equation:

$$\{(Dc_1-Du_1)/Du_1\} \times 100(\%) \quad \text{or} \quad \{(Dc_2-Du_2)/Du_2\} \times 100(\%)$$

is within a range of 0.1-1.0% over the full width w of the belt 4, and particularly it is favorable to be within a range of 0.4-0.8% at the central region Rc and 0.1-0.5% at both side regions Rs and the enlarging ratio of the belt 4 at both side regions Rs is made smaller than the enlarging ratio at the central region Rc. More preferably, the enlarging ratio is gradually decreased from the widthwise center position of the belt 4, the equatorial plane e in the illustrated embodiment toward the end of the belt 4 within the above range.

And also, it is favorable that an outer diameter $Du_3$ of the uncured tire 1 shown in FIG. 1 is larger than an inner diameter $Dc_3$ of a rib 9 in the mold 8 shown in FIG. 4. This is effective in order to make the enlarging ratio of the belt 4 as small as possible, and particularly to make the enlarging ratio at both side regions Rs as small as possible and minimize the enlarging ratio in the vicinity of the ends of the side region Rs. Even if the outer diameter $Du_3$ is made larger than the inner diameter $Dc_3$, the motorcycle tire may be produced without causing the biting in the mold because the thickness of the tread rubber 5 is largely thin and the bending rigidity of the belt 4 is considerably small and the internal pressure is adjusted in the insertion of the uncured tire 1 into the mold 8 different from the tire for four-wheeled automobiles.

Although the enlarging ratio of the belt in the radial tire for four-wheeled automobile is within a range of 3-4% in the use of the split-type mold and 4-5% in the use of two-split mold, the enlarging ratio of the belt 4 in the motorcycle tire is characterized by having a considerably small value. Moreover, the enlarging ratio of the belt 4 in the central region Rc is favorable to be smaller than a value of a ratio of height of a rib 9 to a radius $Dc_4/2$ (see FIG. 4) of a base portion of the rib 9 at the inner face of the mold 8 corresponding to the enlarging ratio at the central region Rc larger than that of the side region Rs. The value of the latter ratio is represented by an equation of $\{(Dc_4-Dc_3)/Dc_3\} \times 100(\%)$. In general, such a value of the ratio in this type of the motorcycle tire is within a range of 1.3-2.5%, and the enlarging ratio of the belt 4 in the central region Rc is within a range of 0.4-0.8% smaller than the above range of the value.

Such a small enlarging ratio of the belt 4 in the central region Rc is favorable for holding the spaces 7cs and 7fs of the steel cord member 7 and can advantageously solve the problem that when the uncured tire 1 is pushed onto the inner face of the mold 8 as shown in FIG. 4, the steel cord members 7T are slid down in the widthwise direction, particularly at both side regions Rs due to the fact that a value of a ratio $(h_8/W_8)$ of height $h_8$ of the tread portion to width $W_8$ of the tread portion and a value of a ratio (hc/Wc) of height hc of the belt 14 to width Wc of the belt 14 are considerably larger than those in the other tires for four-wheeled automobile, and hence the scattering of the arrangement of the steel cords 17 and the scattering of tension in the belt 14 of the cured tire 11 can be improved.

The steel cord member 7 holding the spaces 7cs and 7fs is suitable to have a cord diameter of not less than $d\{(1/\sin \pi/N)+1\} \times 1.4$ (mm) when the number of filaments is N and a diameter of the filament is d (mm).

After the inflation under an internal pressure, the uncured tire 1 is heated from the outside of the mold 8 and at the same time the inside of the uncured tire 1 is heated. By such a heating, the plasticity is considerably lowered and the fluidity is increased in all rubber of the uncured tire 1. By such a fluidization of rubber and the pressurizing action is penetrated the coating rubber of the steel cord member 7 into the whole of the space 7cs, and the coating rubber is preferably penetrated into the space 7fs among all of the mutual filaments 7f. At a state of holding the penetration of the coating rubber, the uncured tire 1 is subjected to vulcanization, whereby the steel cords 17 in the cured tire are rendered into cords constituting the belt 14 having a non-elongation property.

Figure 5:
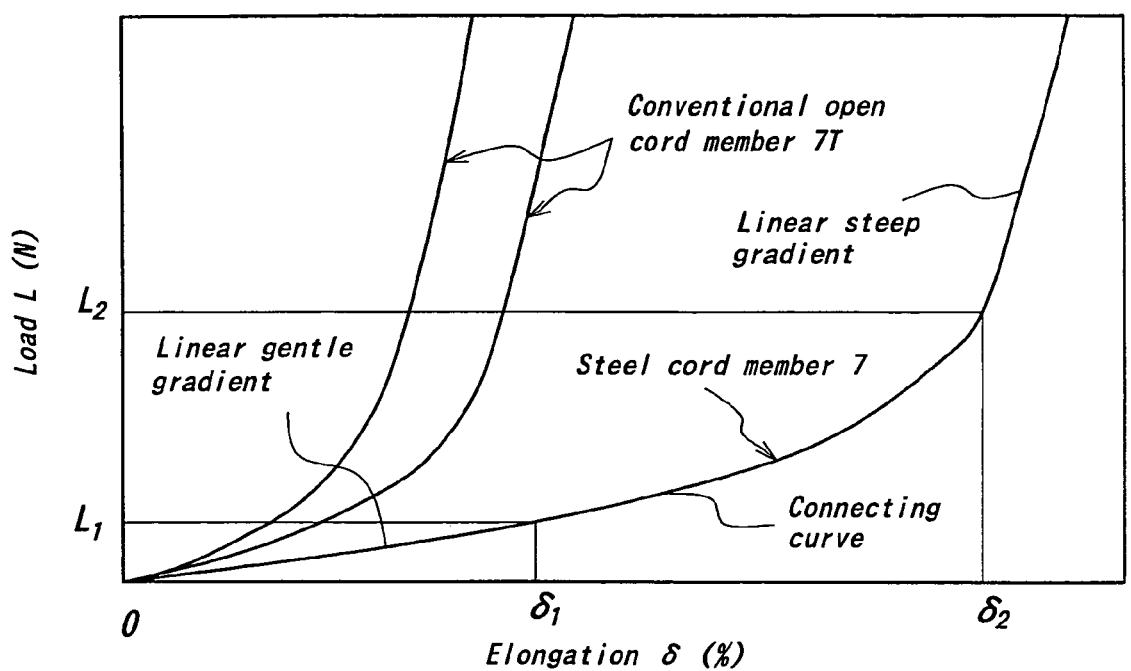
FIG. 5 is a load-elongation curve of the steel cord member shown in FIGS. 2 and 3.

In FIG. 5 is shown a curve of a relation between load L (N) and elongation δ (%) in the steel cord member 7 in a direction of an axial line. In FIG. 5 is also shown the curve of the conventionally open-twisted steel cord member 7T having substantially a non-elongation property and a section in FIG. 8, which is used in a belt of a tire for four-wheeled automobile. The steel cord member 7 indicates a composite elongation property consisting of three zones in FIG. 5. That is, the steel cord member 7 has an elongation property indicating a long linear gentle gradient within a range of a load L (N) from a value of zero to a given value $L_1$, an elongation property indicating a linear steep gradient within a range of from a load value $L_2$ to a load corresponding to 70% of a load at break, and an elongation property indicating a downward convex curve having a small curvature between the load $L_1$ and the load $L_2$. Such a curve zone is a downward convex connecting line smoothly connecting a terminal end of the linear gentle gradient zone to a start end of the linear steep gradient zone.

The elongation at break of the steel cord member 7 is adaptable to be within a range of 3.0-6.0%. And also, the range between the elongations $\delta_1$ and $\delta_2$ corresponding to both ends of the connecting line, i.e. value of $(\delta_2-\delta_1)$ is adaptable to be at least 5%, preferably at least 10% of the above elongation at break of the steel cord member 7. This is favorable for sufficiently holding the spaces 7cs and 7fs.

In the invention, it is favorable that tensile force is applied to the steel cord member 7 in the belt 4 within a range of the elongation property indicating the long linear gentle gradient among the elongation properties shown in FIG. 5 at a time that the uncured tire 1 is placed in the mold 8 and an internal pressure of a given gauge pressure P is filled in the uncured tire 1. In this case, it is favorable that the steel cord member 7 in the belt 4 of the uncured tire 1 having a final shape pushed onto the inner face of the mold 8 may hold sufficient quantity of the spaces 7cs and 7fs even if an elongation on the connecting line near to $\delta_1$ in FIG. 5 is applied.

At a state that the cured tire 11 is assembled onto a nominal rim before the filling of a nominal internal pressure in the tire 11, an elongation corresponding to a pre-stretch or a tensile force is already applied to the steel cords 17 themselves in the belt 14 of the tire 11. The value of the elongation at this state is favorable to be a value corresponding to the elongation in the linear gentle gradient zone of the steel cord member 7.

Although the elongation of the steel cord 17 based on the tensile force differs in accordance with widthwise position in the belt 14 and cooling condition in the belt 14 of the tire 11 taken out from the mold 8 after the completion of the vulcanization, the elongation corresponding to the tensile force applied to the steel cord 17 in the belt 14 of the cured tire 11 after the assembling onto the nominal rim and before the inflation under the nominal internal pressure is smaller than the elongation corresponding to total tensile force applied to the steel cord member 7 in the uncured tire 11 having a final shape pushed onto the inner face of the mold 8.

Therefore, the elongation based on the tensile force applied to the steel cord 17 in the belt 14 of the cured tire 11 after the assembling onto the nominal rim and before the inflation under the nominal internal pressure is preferable to have a value of 0.20-0.85% over the full width of the belt 14 viewing from the curve of the relation between load and elongation in the steel cord member 7 as shown in FIG. 5. Furthermore, it is preferable that the elongation at the central region of the belt 14 corresponding to the central region Rc is larger than the elongation at both side regions of the belt 14 corresponding to both side regions Rs and preferably the value of the elongation is gradually decreased from the widthwise center position of the belt 14 toward both side ends in view of a point of preventing the sliding down of the steel cord members 7 accompanied with the enlargement of the belt 4 within the mold 8.

In the belt 14 of the cured tire 11 after the assembling onto the nominal rim and before the inflation under the nominal internal pressure, it is also preferable that viewing from the curve of the relation between load and elongation in the steel cord member 7 shown in FIG. 5, the elongation of the steel cord 17 in the connecting line portion indicating a curve having a small curvature between the loads $L_1$ and $L_2$ is not less than 5%, preferably not less than 10% of the elongation at break of the steel cord member 7.

Figure 6:
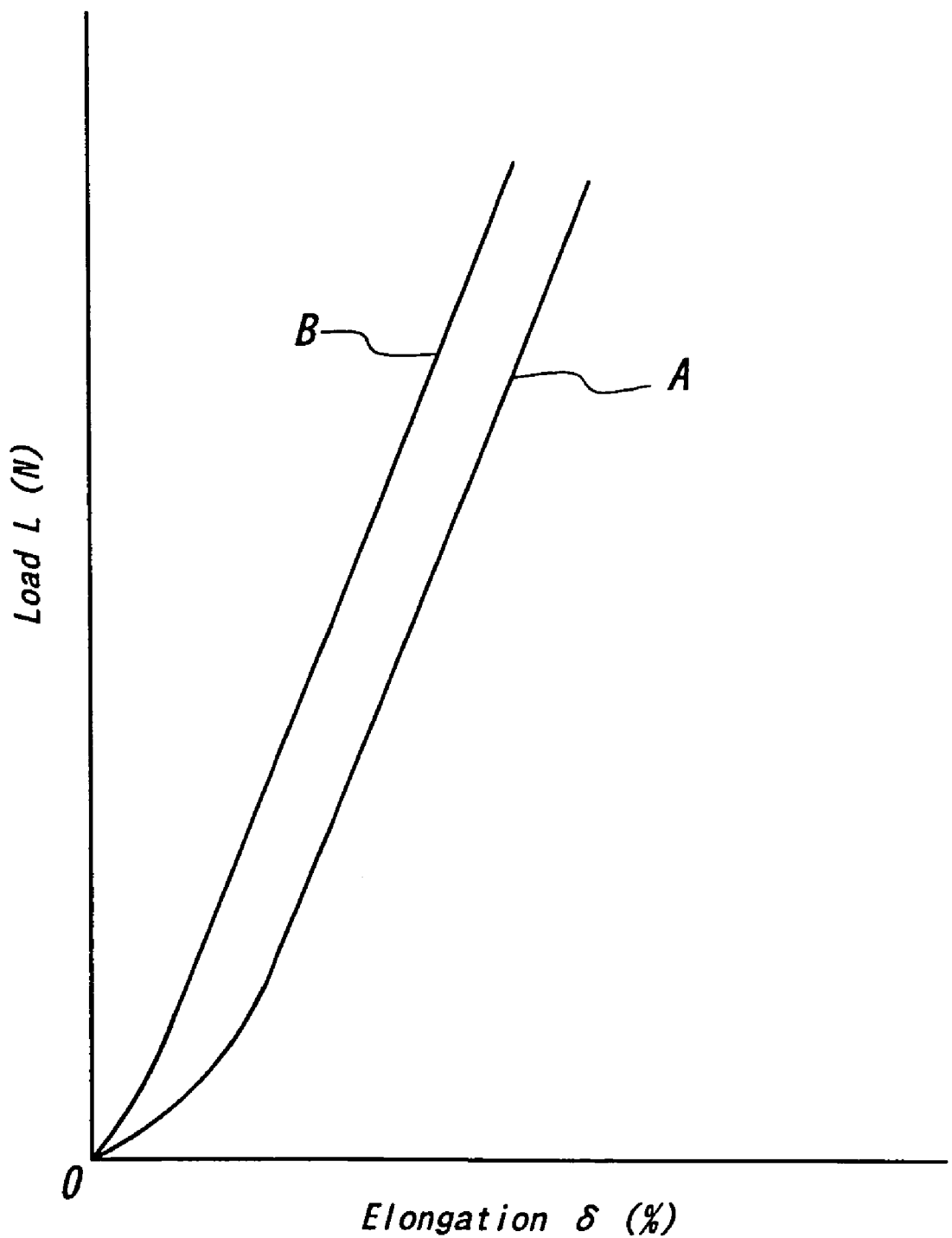
FIG. 6 is a load-elongation curve of a steel cord taken out from a belt of the cured tire.
Figure 7:
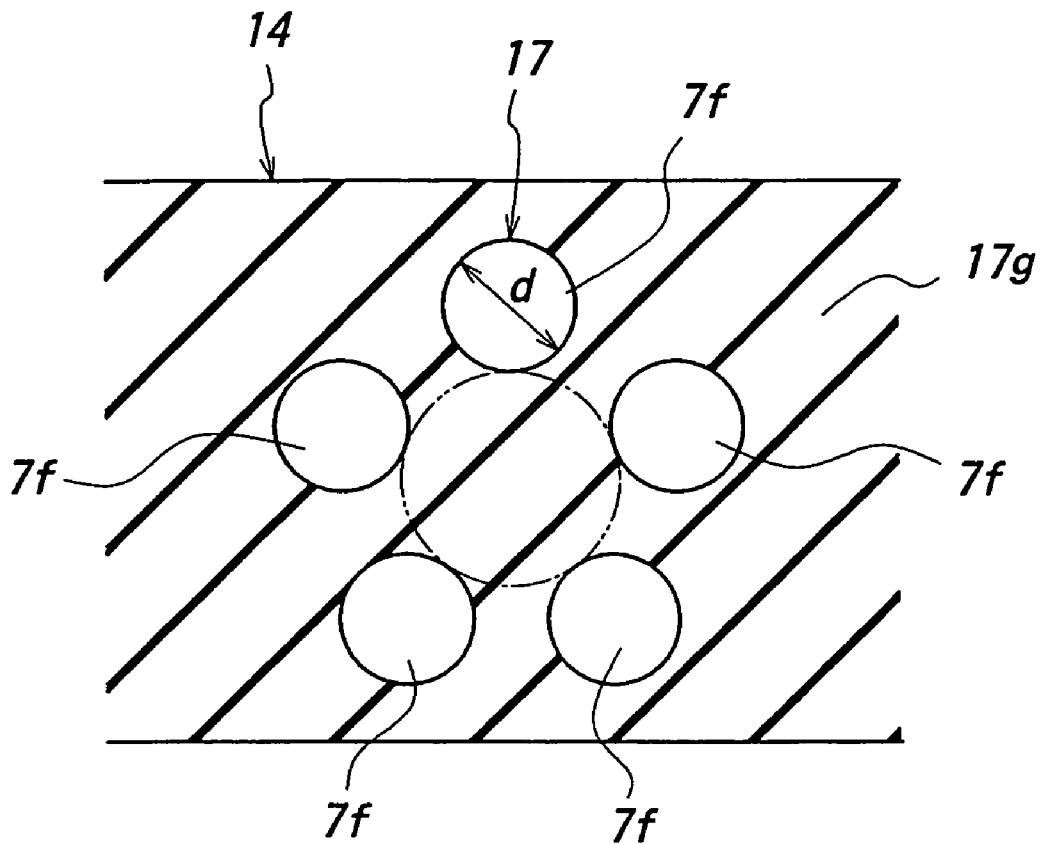
FIG. 7 is a diagrammatically section view of one steel cord in the belt of the cured tire by the producing method of the invention.

In FIG. 6 is shown a curve of a relation between load L (N) and elongation (%) of a steel cord 17 taken out from the cure tire 11 in a direction of an axial line. Symbol A is a curve of the steel cord 17, and symbol B is a curve of the conventional open steel cord (member 7T shown in FIG. 8) taken out from the tire. In FIG. 7 is shown a section of one steel cord 17 in the belt 14 of the cured tire 11. The elongation property indicating the linear gentle gradient shown in FIG. 5 is not substantially existent in the steel cord 17(A) because rubber 17g adjacent to the steel cord penetrates into the inside of the steel cord 17 as shown in FIG. 7.

Figure 9:
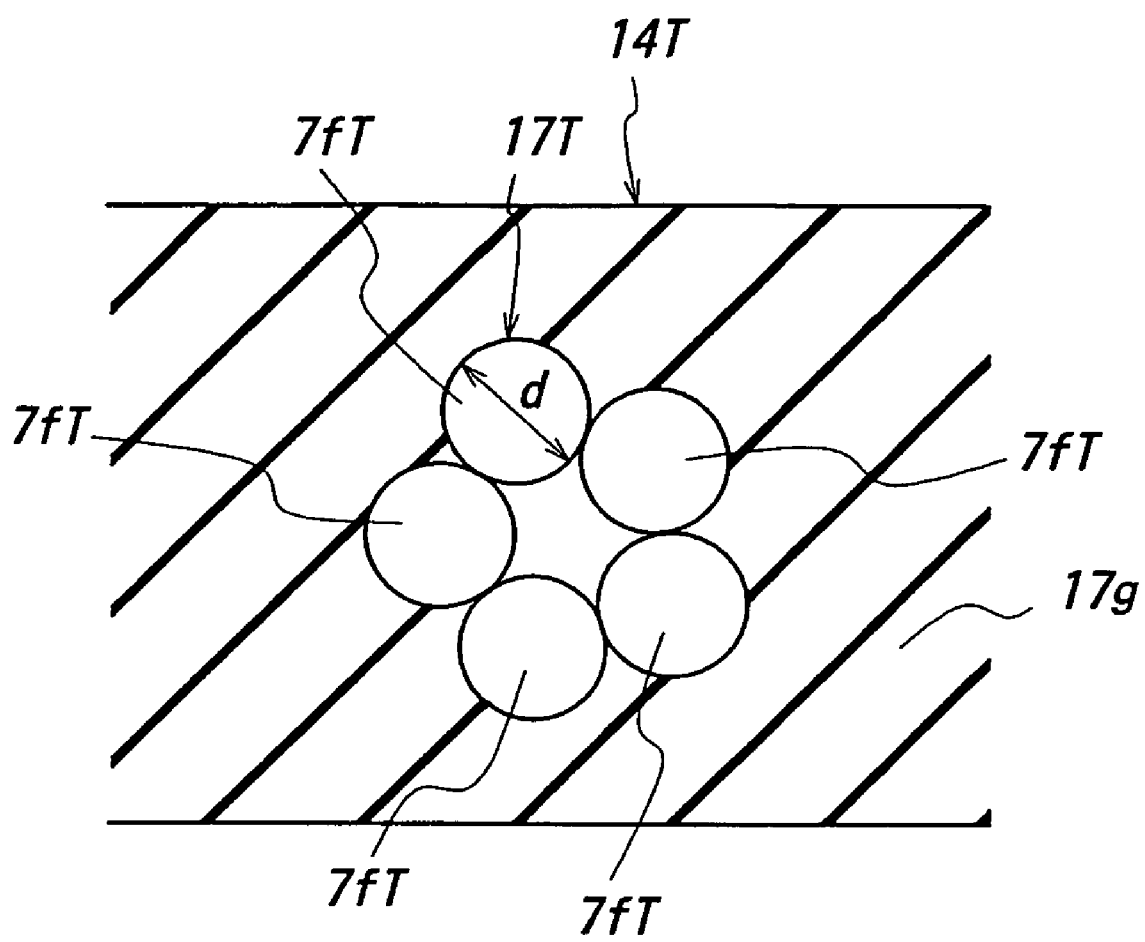
FIG. 9 is a diagrammatically section view of one steel cord in a belt of a cured tire by the conventional producing method.

When the nominal internal pressure is filled in the tire 11, sufficient tensile force is applied to the steel cord 17 though curved region in the relation curve of the member is naturally existent, so that the belt 14 develops sufficient tensile rigidity in the circumferential direction of the tread portion. In this case, the steel cord 17 is somewhat small in the cord diameter as compared with the steel cord member, and the cord diameter thereof is $d\{(1/\sin \pi/N)+1\} \times 1.04$ (mm) when the number of filaments is N and the diameter of the filament is d (mm). Moreover, the above tensile force is applied to the conventional open steel cord member 7T, but the space 7fsT is completely closed at the time of finishing the pushing onto the inner face of the mold and hence the penetration of rubber 17g into the central space 7csT is equal to zero. In other words, the rise of the conventional open steel cord (B) shown in FIG. 6 is steep. In FIG. 9 is shown a section of the open steel cord 17T in the conventional belt 14T.

FIG. 7 shows a section of an ideal steel cord 17 after the completion of the vulcanization. Actually, the steel cord 17 has the forms of arranging the filaments as shown in FIGS. 3B to 3G. The steel cord 17 in the belt 14 has a structure that all filaments 7f are separated away from each other in the coating rubber 17g over the full width of the belt 14. That is, the steel cord 17 has a form that the spaces 7cs, 7fs are filled with the coating rubber 17g and each of these filaments 7f is completely embedded in the coating rubber 17g. As a result, the belt 14 has the following merits:

(1) Although the elongation property as the steel cord member apparently remains, the steel cords 17 become substantially inextensible cords and are arranged substantially in parallel to an equatorial plane e of the tire 11 to sufficiently ensure tensile rigidity of a tread rubber 15 in the circumferential direction, which is possible to cope with external force in use, so that the sufficient high-speed durability is obtained and the bending rigidity of the tire 11 in the axial direction is effectively reduced to develop an excellent straight running stability;

(2) The propagation of water or the like into the steel cord 17 in the cord existing direction accompanied with external injury of the tire 11 is prevented to largely improve the lowering of the durability due to the corrosion of the steel cord 17;

(3) The impact force from irregularity or projection on road surfaces is born by each of the filaments 7f separately embedded in the coating rubber 17g rather than the steel cord 17, so that the excellent property of absorbing the impact force is considerably developed as compared with the conventional steel cord;

(4) Since the coating rubber 17g is existent around the filament 7f, the effect of preventing a peeling phenomenon of the steel cord 17 from the coating rubber 17g or the effect of improving the separation resistance is largely developed.

Further, the ratios in the belt 4 during its building are optimized and the enlarging ration of the belt 14 in the mold 8 is made largely smaller than the conventional one, whereby the scatterings of tension applied to the steel cords 17 constituting the belt 14 of the tire 11, end count of the steel cords 17, the thickness of the tread rubber 15 and the like are made small in the final shape of the uncured tire 1 pushed onto the inner face of the mold 8 and the rigidity distribution of the tread portion becomes uniform, so that the uniformity performances are improved to bring about good results on various performances. Moreover, the term "uniformity" used herein includes surface irregularity of the tread rubber 15, change quantity of reaction force in the radial direction of the tire 11, and change quantity of force in the axial direction of the tire 11.

Since the cords of single twisting construction are used as the steel cord 17 in the belt 14 instead of cords having a special and expensive strand construction such as langley construction or the like, it is possible to obtain the above various merits under a low cost.

Referring to FIG. 4, the cured tire 11 produced by the above method comprises a radial carcass 13 toroidally extending between a pair of bead cores 12 and comprised of one or more rubberized plies containing organic fiber cords therein, one ply in the illustrated embodiment, and a belt 14 formed by winding steel cord(s) 17 about an outer peripheral portion of the carcass 13 so as to arrange substantially in parallel to an equatorial plane e of the tire 11, which are covered with a tread rubber 15 and sidewall rubbers 16. The belt 14 has a width corresponding to approximately a full width of the tread portion or tread rubber 15.

At a section of the tire 11 assembled onto a nominal rim and inflated under a nominal internal pressure, a ratio of height corresponding to height $h_8$ to width corresponding to tread width $W_8$ is within a range of 0.2-0.40, preferably 0.25-0.35. In other words, the uncured tire 1 is cured by using the mold 8 satisfying the range of the above ratio. Of course, it is well-known that the value of the above ratio differs between front and rear tires in the motorcycle. That is, the value of the above ratio is generally not more than 0.3 in the rear tire and not less than 0.3 in the front tire, so that the front and rear tires are a combination of different values of the above ratio.

The following examples are given in illustration of the invention and are not intended as limitations thereof.

As an example, there are provided radial ply tires 11 for motorcycle having tire sizes of 120/70R17 as a front tire and 190/50ZR17 as a rear tire by subjecting uncured tires 1 shown in FIG. 1 to vulcanization building so as to have a structure as shown in FIG. 4. The carcass 13 is comprised of two radial carcass plies each containing rayon cords of 1650d/2 for front tire and one radial carcass ply containing nylon cords of 1260d/2 for rear tire, respectively. The belt 14 is formed by helically winding rubberized steel cord 17 (cord diameter: 0.61 mm) having a single twisting construction of 1×5×0.21 (d=0.21 mm) as shown in FIGS. 2 and 3 in both the front and rear tires.

The steel cord member 7 shown in FIGS. 2 and 3 has a cord diameter of 0.90 mm. The uncured tire 1 is built by pushing the tire 1 onto the inside of the mold 8 within a range of an elongation $\delta_1$ shown in FIG. 5 for the curve of relation between load L (N) and elongation $\delta$ (%) in the steel cord member 7. Of course, even if the elongation is within a range capable of holding the spaces 7cs, 7fs in a final shape inside the mold 8, the building is carried out within a range of elongation $\delta_1$-$\delta_2$ to obtain a cured tire.

In FIG. 5, an elongation at a terminal end of linear gentle gradient of the steel cord member 7 or maximum elongation $\delta_1$ is 0.85%, and an elongation $\delta_1$-$\delta_2$ of a connecting line region is 0.85-1.7%, and an elongation at a start end of linear steep gradient or elongation from minimum elongation $\delta_2$ to 70% of elongation at break is 1.70-3.0%.

And also, the elongation in the winding of the steel cord member 7 during the formation of the belt 4 in the uncured tire 1 is approximately 0.25%, and the enlarging ratio of the belt 4 in the mold 8 is about 0.5% at the central region Rc and about 0.2% at both side regions Rs. As a result, the elongation $\delta$ applied to the steel cord member 7 in the final shape of the uncured tire 1 inside the mold 8 is 0.75% in a region corresponding to the central region Rc and is less than the above value in a region corresponding to the side region Rs, and hence the spaces 7fs between the mutual filaments 7f and the central space 7cs are sufficiently held.

When the cured tire 11 is assembled onto a nominal rim before the inflation under a nominal internal pressure, the steel cord 17 in a region corresponding to the central region Rc of the belt 14 has a found elongation of 0.59%. And also, all of a value of ratio hc/dc at the central region Rc in the building of the belt 4 and a value of a ratio of height corresponding to the height $h_8$ to width corresponding to tread width $W_8$ are 0.34 for front tire and 0.26 for rear tire, respectively. In this case, however, a value of ratio hs/ds at both side regions Rs in the formation of the belt 4 is made smaller than that at the central region Rc.

Figure 8:
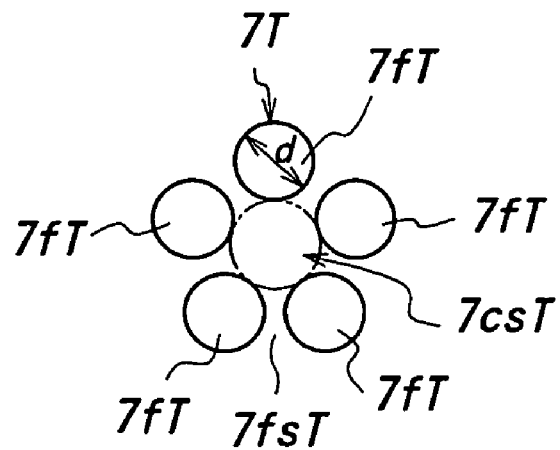
FIG. 8 is a diagrammatically section view of the conventional open steel cord.

In order to evaluate the performances of the example tire, there are provided a conventional tire having the same structure as in the above example except that steel cord members 7T shown in FIG. 8 are used in the belt, and a comparative tire using the same steel cord member as in the example, wherein although the space 7fs between the mutual filaments 7f is existent among the filaments 7f, the value of tensile force or elongation $\delta$ applied to the steel cord member 7 in the final shape of the uncured tire inside the mold is different from that of the example and hence rubber penetration ratio into the central space 7cs is largely different from that of the example. Because, tensile force near to load $L_2$ in the relation curve of FIG. 5 is applied to the steel cord members 7 in the final shape of the uncured tire inside the mold 8 in the comparative example. In the comparative example, the enlarging ratio in a region corresponding to the central region Rc at the final shape of the uncured tire inside the mold 8 is 0.5 likewise the example. With respect to the example and the comparative example, difference in tensile force and elongation applied to the steel cord member at the final shape of the uncured tire inside the mold are changed by adjusting tension of the steel cord member in the formation of the belt.

Each of the example tire, comparative tire and conventional tire is assembled onto front and rear wheels of a motorcycle having a displacement of 1.0 liter and actually run on a test course by a professional test driver to evaluate running stability inclusive of cornering stability and straight running stability during the running at a high speed on a smooth road surface and a property of absorbing impact force during the running on irregular road surfaces by a driver's feeling. The evaluation is represented by 10 point method, wherein the larger the numerical value, the better the property. The test results are shown in Table 1.

Then, each tire is assembled onto a nominal rim and inflated under a nominal internal pressure and then change of lateral force among uniformity properties of the tire itself is measured under a nominal load to obtain results as shown in Table 1. Moreover, the measured results are represented by an index on the basis that the conventional tire is 100, wherein the smaller the index value, the better the property.

Further, an external injury arriving at the steel cord in the belt is applied to the tread portion in each tire assembled onto the nominal rim and inflated under the nominal internal pressure and left to stand at a given temperature for a given time, and thereafter the tire is cut to measure a propagation degree of rust in the steel cord. The measure results are represented by an index on the basis that the conventional tire is 100 as a cord rusting propagation property, wherein the smaller the index value, the better the property. The measured results are also shown in Table 1.

Finally, the tire used in the actual running test is cut to take out the steel cord from the belt and then measure a penetration degree of the coating rubber into a central portion of the steel cord. The penetration degree is represented by a filling ratio (%) of the coating rubber occupied in an area of a central portion at a section of the cord as shown by a phantom line in FIG. 7. The larger the value of the ratio (%), the better the property. The measured ratio is also shown in Table 1.

TABLE 1

| Items | Conventional Example | Comparative Example | Example |
|---|---|---|---|
| Running stability (evaluating point) | 5 | 6 | 8 |
| Impact force absorbability (evaluating point) | 5 | 5 | 8 |
| Uniformity (index) | 100 | 70 | 70 |
| Cord rusting propagation property (index) | 100 | 100 | 10 |
| Rubber filling ratio (%) | 0 | 0 | 100 |

As seen from the results of Table 1, the coating rubber is filled in the whole of central portion at the section of the steel cord and in spaces between mutual filaments in the cord in the example tire, so that the impact force absorbability and cord durability are largely improved as compared with the conventional example and the comparative example, whereby the running stability is considerably improved as compared with the conventional and comparative examples, and it is simultaneously possible to improve the uniformity properties which have come into problem in the conventional techniques. And also, it is possible to use low-cost steel cord members of single twisting construction without using special and high-cost twisting constructions in order to develop the above effects.

As mentioned above, according to the invention, there can be provided motorcycle tires considerably improving belt cord durability, high-speed durability, impact force absorbability and running stability and capable of improving uniformity properties, which are produced by a method wherein spaces are formed between filaments over a full length of a steel cord in a circumferential direction of a belt using a low-cost steel cord member and an uncured tire is built at a state of holding such spaces and also the spaces can be held even at a state of pushing the uncured tire onto an inside of a mold and rubber can sufficiently be penetrated between the filaments constituting the cord and into inside of the cord by fluidizing rubber through heat for vulcanization.

What is claimed is:

1. A method of producing a motorcycle tire, comprising:
providing an uncured motorcycle tire comprising a radial carcass ply extending between a pair of bead portions, a belt made of uncured rubberized steel cord members laid on an outer peripheral face of the carcass ply so as to arrange the steel cord members substantially in parallel to an equatorial plane of the motorcycle tire, and a tread rubber and sidewall rubbers laid on outer surfaces of the belt and an uncovered portion of the carcass ply,
placing the uncured motorcycle tire in a mold, and
subjecting the uncured motorcycle tire to vulcanization under a given internal pressure,
characterized in that steel cord members each having either a single twisting construction of 2-7 filaments or a strand bundle construction using such a single twisting construction, and including a space between the mutual filaments over a full length of the cord is used in the belt, and
that the belt is enlarged in a radial direction within a range of holding the space between the mutual filaments in the steel cord when the uncured motorcycle tire is pushed onto an inner face of the mold under an inflation of the internal pressure, and
that the vulcanization of the uncured motorcycle tire is completed at a state that a coating rubber for the steel cord members in the belt freely fluidizing at a high temperature under a high pressure is penetrated into the full space between the mutual filaments and such a rubber penetration is held by heating the uncured motorcycle tire,
wherein the steel cord member used in the belt satisfies a relation of load-elongation curve when the elongation is plotted on an abscissa and the load is a load in an axial direction of the cord that an elongation ranging from a load of zero to a given load indicates a linear gentle gradient and an elongation ranging from a load exceeding the given load to a load corresponding to 70% of a breaking load indicates a linear steep gradient and a connecting line between terminal and start ends of these gradient lines indicates a downwardly convex curve having a small curvature, and a tensile force of a steel cord in a belt of a vulcanized motorcycle tire after assembled onto an nominal rim but before filling with an nominal internal pressure is rendered into a range of loads corresponding to the elongation on the linear gentle gradient in the above relation curve.

2. The method according to claim 1, wherein the steel cord member used in the belt has an elongation at break of 3.0-6.0%, and an elongation range corresponding to both ends of the curved connecting line of small curvature in the above curve of the steel cord member occupies at least 5% of the elongation at break.

3. The method according to claim 1, wherein the steel cord member used in the belt has an elongation at break of 3.0-6.0%, and an elongation range corresponding to both ends of the curved connecting line of small curvature in the above curve of the steel cord member occupies at least 10% of the elongation at break.

4. The method according to claim 1, wherein the steel cord member has a space in a central portion at a section of the cord over a full length thereof, and at least one space between filaments communicating from the central space to an exterior of the steel cord member is existent over the full length of the cord.

5. The method according to claim 1, wherein one or more steel cord members for the belt are previously coated with an uncured rubber under a condition of tensile force within a range of holding the space, and the one or more steel cord members coated with the uncured rubber are helically and successively wound on the outer peripheral face of the radial carcass ply under the condition of tensile force within the range of holding the space to form the belt of one or more layers.

6. The method according to claim 1, wherein a rubber sheet covering the steel cord member for the belt is previously laid on an outer periphery of the radial carcass ply, and one or more steel cord members for the belt are successively and helically wound on the rubber sheet under a condition of tensile force within a range of holding the space and thereafter a coating rubber sheet is laid on the helically wound steel cord member to form a belt of one or more layers.

7. The method according to claim 1, wherein the steel cord member used in the belt has a cord diameter of not less than $d\{(1/\sin \pi/N)+1\} \times 1.4$ (mm) when the number of filaments is N and a diameter of the filament is d (mm).

8. The method according to claim 1, wherein when the uncured motorcycle tire is pushed onto the inner face of the mold under an inflation of the internal pressure, an enlarging ratio of diameter at full width of the belt is within a range of 0.1-1.0%, and an enlarging ratio of diameter in each side region connecting to a central region of the belt in the widthwise direction is made smaller than an enlarging ratio of diameter in the central region.

9. The method according to claim 8, wherein the enlarging ratio of diameter in the central region of the belt in the widthwise direction is within a range of 0.4-0.8%.

10. The method according to claim 1, wherein at a section of the uncured motorcycle tire, a ratio of maximum height (hc) up to a section center of the steel cord member in the central region of the belt as measured from a straight line passing through both ends of the central region of the belt in the widthwise direction thereof to distance (dc) between centers of the steel cord members located at the outermost ends of the central region is within a range of 0.20-0.40, and a ratio of maximum height (hs) up to a section center of the steel cord member in each side region of the belt as measured from a straight line passing through both ends of the each side region to distance (ds) between centers of the steel cord member located at located at both ends of the each side region is made smaller than the above ratio (hc/dc).

11. The method according to claim 1, wherein when the uncured motorcycle tire is pushed onto the inner face of the mold provided with a rib forming a groove in the tread rubber, the enlarging ratio in the central region of the belt is made smaller than a ratio of rib height to a radius of a rib base portion in the inner face of the mold corresponding to the central region.

12. The method according to claim 1, wherein the uncured motorcycle tire is subjected to vulcanization by using the mold so that a ratio of maximum height of an outer surface of the tread rubber as measured from a straight line connecting both ends of the tread rubber in the widthwise direction to distance between both ends of the tread rubber in the widthwise direction is within a range of 0.20-0.40 at a section of a tire after the vulcanization when the motorcycle tire is assembled onto an nominal rim and inflated under an nominal internal pressure.

13. The method according to claim 1, wherein when the motorcycle tire is assembled onto the nominal rim before inflation under the nominal internal pressure, each steel cord has an elongation by tensile force applied thereto such that an elongation in a full width of the belt is 0.20-0.85% and an elongation in a central region of the belt is larger than an elongation in each side region.

14. The method according to claim 1, wherein when the motorcycle tire is assembled onto the nominal rim before inflation under the nominal internal pressure, the steel cords in the central region of the belt have an elongation by tensile force applied thereto such that a value of elongation in a full width of the belt is 0.30-0.80%.

15. The method according to claim 1, wherein when the motorcycle tire is assembled onto the nominal rim before inflation under the nominal internal pressure, a range of elongation of the steel cords in the curve of the connecting line has a value of not less than 5% of an elongation at break.

16. The method according to claim 1, wherein when the motorcycle tire is assembled onto the nominal rim before inflation under the nominal internal pressure, a range of elongation of the steel cords in the curve of the connecting line has a value of not less than 10% of an elongation at break.

17. The method according to claim 1, wherein the rubberized cords of the carcass comprise organic fiber cords, and the steel cords of the belt are helically wound on an outside of the carcass in a radial direction thereof and disposed within the coating rubber, and wherein a ratio of maximum height up to an outer surface of a tread rubber as measured from a straight line connecting both ends of the tread rubber in the widthwise direction to a distance between both ends of the tread rubber in the widthwise direction thereof is within a range of 0.20-0.40.

* * * * *